United States Patent [19]

Ono et al.

[11] Patent Number: 5,027,196
[45] Date of Patent: Jun. 25, 1991

[54] METHOD OF AND APPARATUS FOR SIMULATING OBJECT IMAGE TO BE PRINTED

[75] Inventors: Yoshio Ono; Noriyuki Shimano, both of Kyoto, Japan

[73] Assignee: Dainippon Screen Mfg. Co., Ltd., Kyoto, Japan

[21] Appl. No.: 377,394

[22] Filed: Jul. 10, 1989

[30] Foreign Application Priority Data

Jul. 12, 1988 [JP] Japan .................................. 63-174237

[51] Int. Cl.⁵ .............................................. G03F 3/10
[52] U.S. Cl. .......................................... 358/76; 358/80
[58] Field of Search .................... 358/76, 78, 75, 80

[56] References Cited

U.S. PATENT DOCUMENTS 4,583,186  4/1986  Davis et al. ............................ 358/76
4,760,458  7/1988  Watanabe et al. .................... 358/76

FOREIGN PATENT DOCUMENTS 0207238  12/1982  Japan ..................................... 358/76
0232542   9/1985  Japan ..................................... 358/76
0138945   6/1986  Japan ..................................... 358/76
62-198966 9/1987  Japan .

Primary Examiner—Howard W. Britton
Assistant Examiner—Michael H. Lee
Attorney, Agent, or Firm—Lowe, Price, LeBlanc and Becker

[57] ABSTRACT

An images simulator (20) comprises a storage unit 31 for storing reference image data by which reference image of proper color and gradation are reproduced in printing process. Original image data (I (B, G, R)) are read by an image reading unit (11) and processed by an image processing unit (13) under reproduction conditions set in a condition setting unit (12). A proof image is displayed on a CRT (30) along with the reference image as a function of the original image data and the reference image data, respectively. An operator adjusts the reproduction conditions such that color and gradation of the proof image conform to those of the reference image.

12 Claims, 6 Drawing Sheets

METHOD OF AND APPARATUS FOR SIMULATING OBJECT IMAGE TO BE PRINTED

BACKGROUND OF THE INVENTION

1. Field of the invention

The present invention is related to a method of and apparatus for simulating an object image to be printed by showing the image on a display, such as a CRT, prior to production of the separation negatives or positives by an image scanner, such as a color scanner, thereby setting color separation conditions (or reproduction conditions), especially color and gradation conditions which are preferable for reproducing an original image by printing process.

2. Description of the Prior Art

The reproduction conditions are set in an image scanner, such as a color scanner or a color page make-up system, to produce a reproduced image in accordance with requirements for color and gradation conditions. Appearance of the reproduced image concerning color and gradation will be referred to as "color tone" in this specification. The color tone depends on color reproducibilities of respective colors in the original, an overall color balance, etc., and gradation reproducibilities of a highlight and shadow density, characteristics of tone reproduction, contrast, etc.. For black and white printing, the color tone denotes the above stated color and gradation conditions except those concerning chromatic color.

Figure 1:
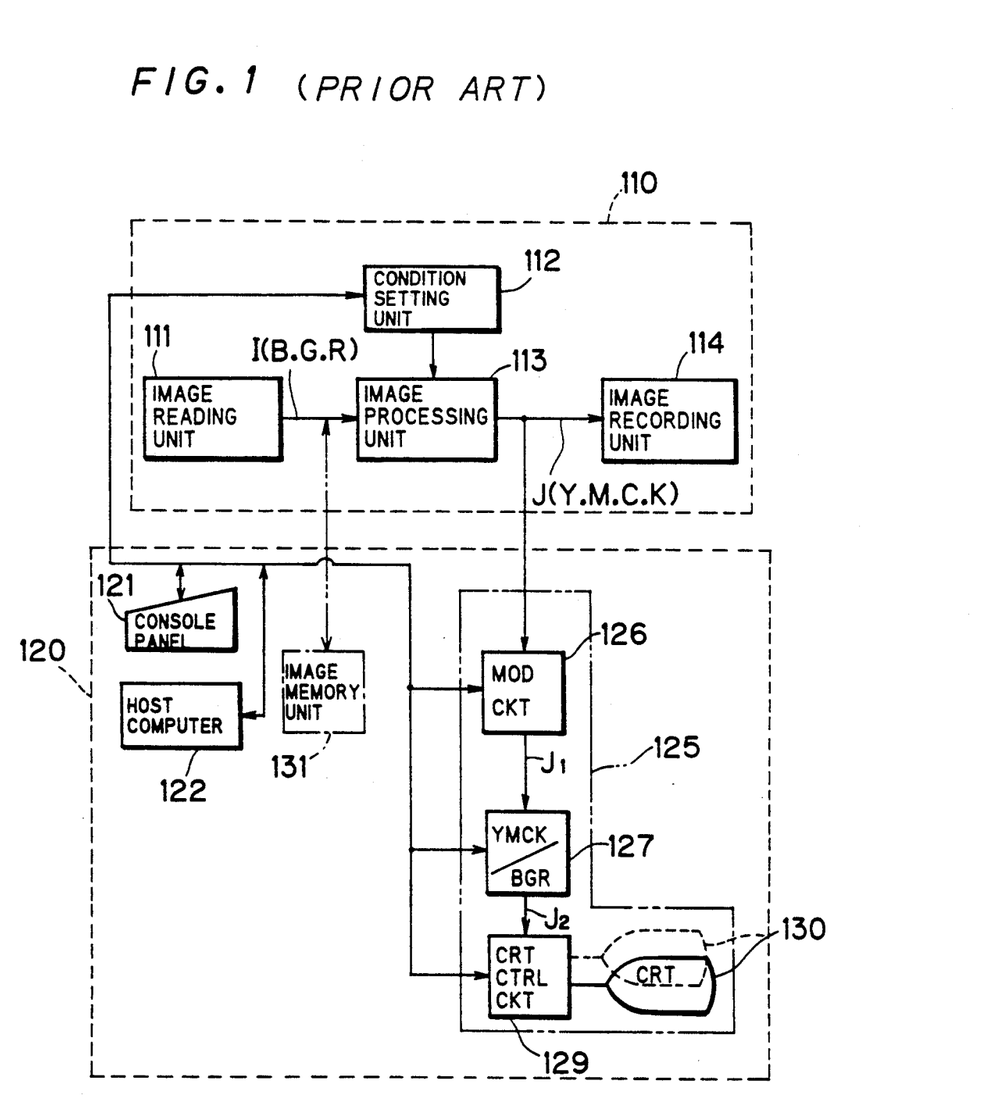
FIG. 1 is a block diagram showing the structure of an apparatus of the prior art.

FIG. 1 is a block diagram showing the structure of an image scanner in the art, which is provided with an image simulator for establishing the reproduction conditions. The image scanner 110 comprises an image reading unit 111 for photoelectrically scanning an original to generate an image signal I, a condition setting unit 112 for setting the reproduction conditions for the image signal I, an image processing unit 113 for processing and modifying the image signal I under the reproduction conditions to generate a modified image signal J, and an image recording unit 114 for exposing a photosensitive material by scanning light beam or beams as a function of the modified image signal J to produce separation negatives (or separation positives). Incidentally, printing plates, which are usually four plates for yellow, magenta, cyan and black printers, are produced with the separation negatives, a color printed sheet then is produced by loading the printing plates in a printing machine.

The image simulator 120 comprises a console panel 121, a host computer 122 and a monitor unit 125. The monitor unit 125 comprises a modification circuit 126 for further modifying the modified image signal J to generate first image signals J₁ with yellow (Y), magenta (M), cyan (C) and black (K) components, a matrix circuit 127 for converting the first image signals J₁ into second image signals J₂ with blue (B), green (G) and red (R) components suitable for a CRT display 130, a CRT control circuit 129 for controlling the CRT display 130, and the CRT display 130. The image simulator 120 displays an image simulating the color printed sheet on the CRT display 130 as a function of the modified image signal J.

Because he modification circuit 126 and the YMCK/BGR matrix circuit 127 are digital circuits, the modified image signal J supplied to the monitor unit 125 is firstly A-D converted by an A-D convertor (not shown) provided in the monitor unit 125 if the signal J is an analog signal. On the other hand, if the signal J is a digital signal, it is directly supplied to the modification circuit 126. In either case, a D-A converter not shown) is provided between the YMCK/BGR matrix circuit 127 and the CRT control circuit 129 because the CRT control circuit 129 is an usually analog circuit.

Figure 2:
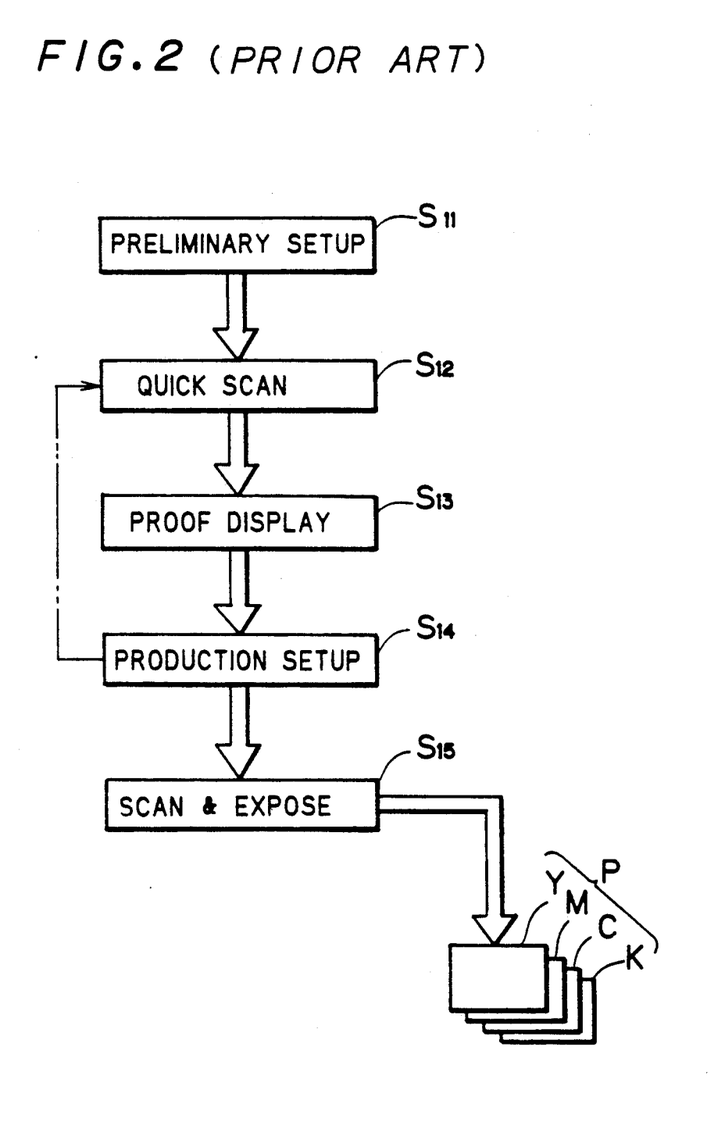
FIG. 2 is a flow chart showing the operation of the prior art.

FIG. 2 is a flow chart showing the procedure of reproducing the separation negatives $\underline{P}$ (with components Y, M, C and K).

At a step $S_{11}$, a seemingly relevant reproduction conditions are set in the condition setting unit 112 on the basis of experience of an operator.

At the next step $S_{12}$, a scanning head not shown) provided in the image reading unit 111 is operated in a quick scan mode. In this mode, the scanning head moves faster than usual, whereby it reads an original to produce an image signal I with respect to fewer pixels than usual which are enough to make an image on the CRT display 130. The image signal I is converted into the modified image signal J by the image processing unit 113 under the reproduction conditions set at the step $S_{11}$. The modified image signal J is supplied to the modification circuit 126, to thereby be stored in an inner memory (not shown) of the modification circuit 126. As shown in FIG. 1, the image signal I (B, G, R) generated by the image reading unit 111 consists of color components of blue (B), green (G) and red (R). Similarly, the modified image signal J (Y, M, C, K) generated by the image processing unit 113 consists of color components of yellow (Y), magenta (M), cyan (C) and black (K).

At a step $S_{13}$, the monitor unit 125 displays a proof image on the CRT display 130 as a function of the modified image signal J. The operator watches the proof image and inputs modification data for the reproduction conditions by means of the console panel 121 into the modification circuit 126 in order to obtain an optimum proof image.

At a step $S_{14}$, the modification data obtained at the step $S_{13}$ are supplied to the condition setting unit 112 to modify the reproduction conditions previously set in the unit 112. The operation of this step $S_{14}$ is referred to as "production setup". If necessary, the proof image is shown again on the CRT display 130 through the steps $S_{12}$ (a quick scan mode) and $S_{13}$ (a proof mode) before the next step $S_{15}$, in order to check whether the production setup is proper or not. The reproduction conditions may be further modified, if necessary.

At the step $S_{15}$, the image scanner 110 operates under the reproduction conditions set at the production setup, and the image recording unit 114 exposes color separation images on photosensitive material. The photosensitive material is developed to form the separation negatives P (Y, M, C, K).

An image memory 131 drawn by a dash dotted line in FIG. 1 is also known in the art. If the image memory unit 131 is provided in the image simulator 120, the image data I (B, G, R) obtained at the quick scan mode are stored in the image memory unit 131. The proof image is shown on the CRT display as a function of the image data I (B, G, R) stored in the image memory unit 131 while the image data I (b, G, R) are processed by the image processing unit 113 under the reproduction conditions stored in the condition setting unit 112. Accordingly, the proof image can be repeatedly shown without the quick scanning of the original.

Further, the operator may directly modify the reproduction conditions in the condition setting unit 112 rather than inputting the modification data into the modification circuit 126, in order to obtain the optimum proof image (or optimum reproduction conditions). Consequently, the modification circuit 126 can be omitted. Moreover, the modification circuit 126 can be also omitted, and the production setup ($S_{14}$) may be simultaneously executed in the proof mode ($S_{13}$).

The operator can confirm the color tone of the object image by means of the CRT display 13 shown in FIG. 1 before the image recording unit 114 exposes the object images. Accordingly, the operator is given an opportunity to set the reproduction conditions while predicting the color tone of the object image, whereby a mistake on setting he reproduction conditions is prevented.

However, the apparatus in the art has the following issues: First, although the color tone of the proof image shown on the CRT display simulates that of the printed sheet as much as possible, the color tone of the proof image and that of the printed sheet do not coincide with each other perfectly. It is because there is a difference in reproducible color gamut between the CRT and color inks. Therefore, the operator cannot always obtain the optimum reproduction conditions. Second, it is difficult to systematically control the color tone for each original image to be treated in sequence. A printed sheet often includes plural object images reproduced from plural original images. Therefore, even if the color tone of each object image is well controlled separately, the color tones within the entire region of the printed sheet can be hardly balanced. Namely, the color tones of the plural object images on the printed sheet are liable to fluctuate to some extent. Accordingly, the reproduction conditions are required to be set in consideration of the difference in the color tone between the printed sheet and the proof image on CRT by a skilled operator. Finally, when an operator continuously watches the CRT display, his sense of the color tone is somewhat paralyzed. Accordingly, it is sometimes difficult even for the skilled operator to establish relevant reproduction conditions because he cannot precisely recognize the color tone.

SUMMARY OF THE INVENTION

The present invention is directed to an apparatus for simulating an object image to be printed which is obtainable by modifying a given original image data into a modified image data and then printing the object image on the basis of the modified image data, the apparatus comprising: (a) means for inputting the original image data, (b) means for variably designating modification conditions employable in modification of the original image data, (c) means coupled to the means (a) and (b) for modifying the original image data into the modified image data under the modification conditions, (d) means for storing a reference image data which previously set by printing a reference image on the basis of the reference image data and then confirming that the reference image thus printed has a designated imaging characteristics, (e) display means for displaying one or more images on the basis of given image data, and (f) means coupled to the means (c), (d) and (e) for transmitting the modified image data and the reference image data to the display means as the given image data in order to display on the display means first and second images on the basis of the modified image data and the reference image data, respectively, so that the first and second images can be visually compared with each other.

The means (f) may include means for transmitting the modified image data and the reference image data to the display means in parallel, whereby the first and second images are displayed on the display means simultaneously.

Alternatively, the means (f) may include means for transmitting the modified image data and the reference image data to the display means alternately, whereby the first and second images are displayed on the display means alternately in time.

The present invention is also directed to a method of and an apparatus for simulating an object image to be printed comprising the steps of: (1) preparing reference image data by which a reference image is reproduced, (2) preparing original image data by which the object image is reproduced. (3) preparing reproduction conditions concerning color and gradation for the original image data, (4) processing the original image data under the reproduction conditions, to thereby generate a modified image data, (5) displaying a proof image simulating the object image on a display means as a function of the modified image data and displaying the reference image data, (6) adjusting the reproduction conditions, and processing the original image data under the adjusted reproduction conditions, to thereby generate the modified image data, and (7) executing repeatedly the steps (5) and (6) such that color and gradation of the proof image conform to those of the reference image.

According to an aspect of the invention, the step (2) comprises a step of spatially compressing or skipping the original image data, to thereby generate a compressed image data, and steps (3) through (7) are executed on the basis of the compressed image data in place of the original image data.

According to another aspect of the invention, the step (2) is performed such that an original of the object image is so read as to generate the original image data skipped in comparison with an image data obtained by ordinary reading.

Preferably, the reference image data are prepared for at least one reference image with respect to each of plural types of images.

Further, the reproduction conditions may include conditions about layout of the object image in a page of printed sheet.

Accordingly, the object of the present invention is to provide a method of and an apparatus for easily establishing relevant reproduction conditions to obtain proper color tone well balanced among many types of images without assistance of a skilled operator.

These and other objects, features, aspects and advantages of the present invention will become more apparent from the following detailed description of the present invention when taken in conjunction with the accompanying drawings.

DESCRIPTION of THE PREFERRED EMBODIMENTS

Figure 3:
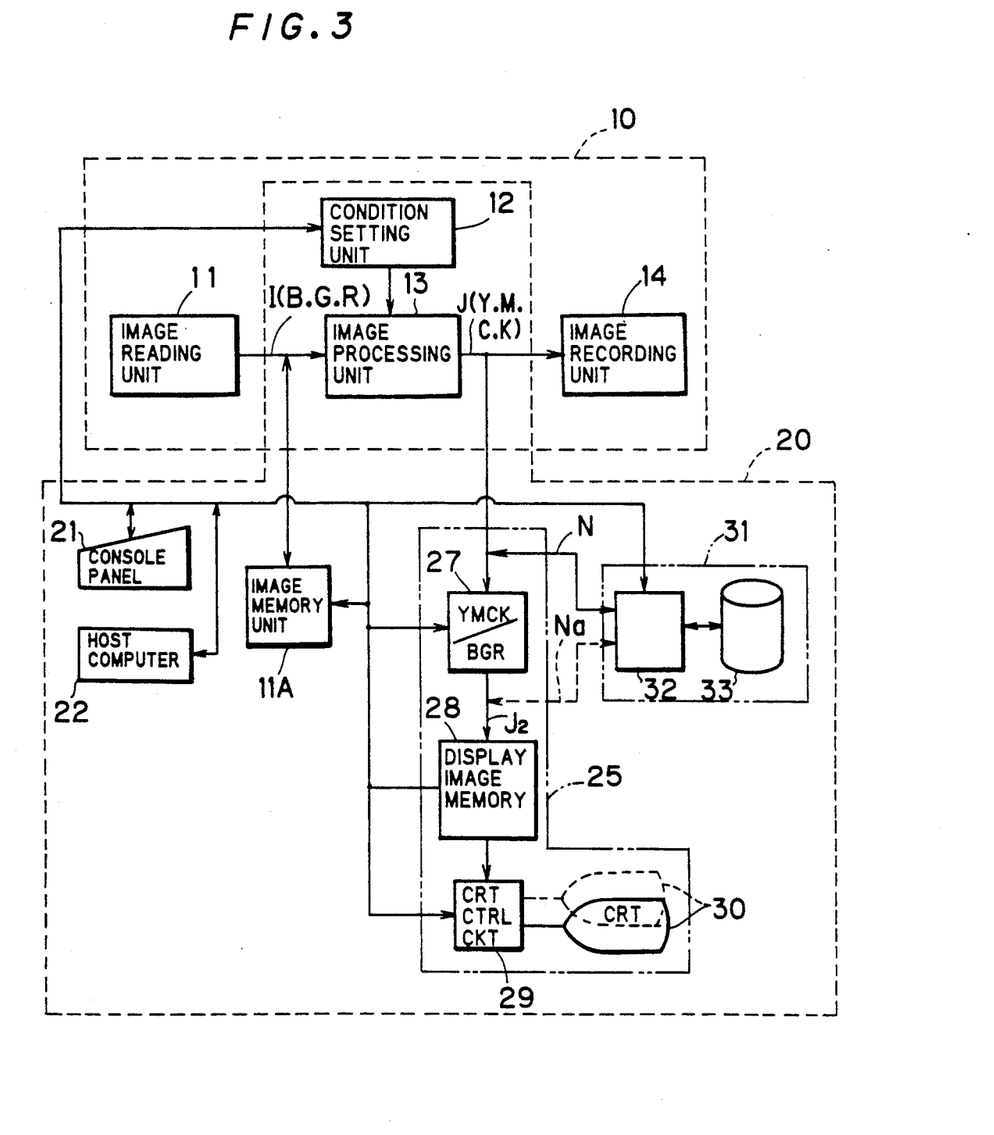
FIG. 3 is a block diagram showing the structure of an apparatus according to a preferred embodiment of the present invention.

FIG. 3 is a block diagram showing structure of a color scanner provided with an image simulator embodying the present invention.

The color scanner 10 comprises, the same as that of FIG. 1, an image reading unit 11, a condition setting unit 12, an image processing unit 13 and an image recording unit 14. The condition setting unit 12 comprises a console panel (not shown) and a data bus. The reproduction conditions may be input into the condition setting unit 12 manually by means of the console panel of the color scanner or in a manner of remote control by means of another console panel 21 provided in the image simulator 20.

The image simulator 20 comprises the console panel 21, host computer 22, an image memory unit 11A, a monitor unit 25 and a storage unit 31 for reference images. The condition setting unit 12 and the image processing unit 13 of the color scanner are also included in the image simulator 20; those units 12 and 13 are commonly employed in the color scanner 20 and the image simulator 20. The image memory unit 11A stores an image data I which is generated by the image reading unit 11 by reading an original, and supplies the image data (or image signal) I to the image processing unit 13 on demand. If the color scanner 10 is composed of analog circuit, the image memory unit 11A is provided with an A-D converter and a D-A converter at the input and output stages, respectively. On the other hand, if the color scanner 10 is composed of digital circuits, those converters are not required. The monitor unit 25 comprises a YMCK/BGR matrix circuit 27, a display image memory 28, a CRT control circuit 29 and a CRT display 30. The monitor unit 25 shows a proof image as a function of a modified image signal J generated by the image processing unit 13. The reference image storage unit 31 is connected with the monitor unit 25.

The storage unit 31 for reference images comprises a storage part 33, such as a magnetic disc, and a storage control circuit 32. The storage part 33 stores reference image data N for reference images which have proper color tone. At least one reference image data N is prepared in advance with respect to each of at least one typical original, such as a landscape, a figure, still life, machinery and the like. The reference image signal N selected on demand is transmitted form the storage part 33 to the CRT display 30 to show the reference image.

The procedure of storing the reference image data N in the storage unit 31 is as follows. When one of the typical originals are read and reproduced by the color scanner 10, the modified image data J (Y, M, C, K) whose color tone is modified by the image processing unit 13 is skipped—only the modified image data J at every some pixel positions are collected—by a skipping circuit (not shown) to form skipped image data representing the image for such pixels as suitable for the CRT display 30. The skipped data is stored in the storage part 33. If the reproduced image of the original has proper color tone, the skipped image data is kept in the storage part 33 as one of the reference image data N. On the other hand, if the reproduced image dose not have proper color tone, the skipped image data is erased.

The reference image data N is supplied to the YMCK/BGR matrix circuit 27 on demand to be converted to image data $J_2$ with B, G and R components to be inputted to the display image memory 28.

The reference image data may be what are formed on the basis of image data $J_2$ with B, G and R components converted by the YMCK/BGR matrix circuit 27 from the modified image data J. In this case, the reference image data $N_a$ is directly supplied to the display image memory 28.

The display image memory 28 temporarily stores the reference image data N (or $N_a$) and image data for an image which is subjected to the reproduction process (the image will be referred to as "object image"). The reference image and/or the object image are shown on the CRT display as a function of the data stored in the display image memory 28.

Figure 4:
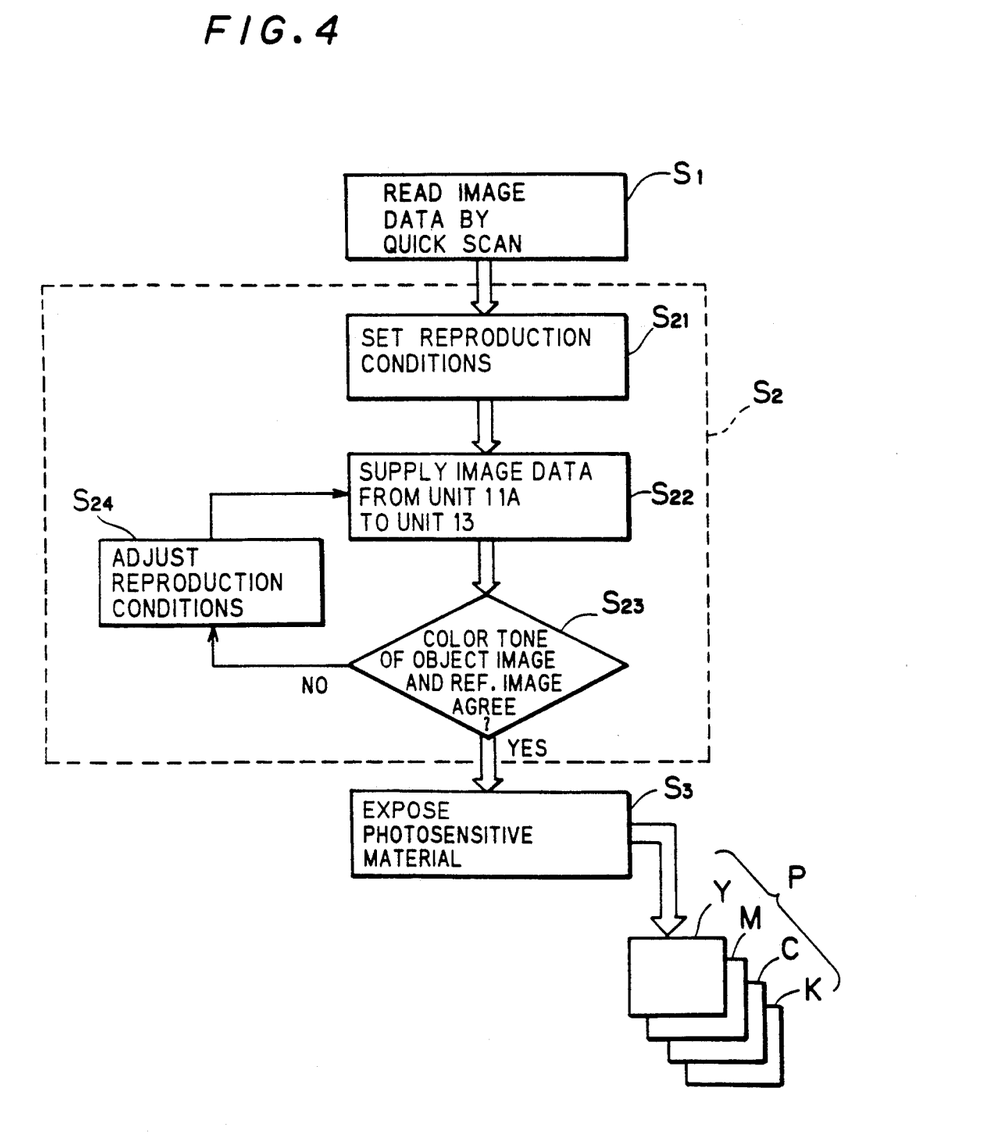
FIG. 4 is a flow chart showing the operation of the preferred embodiment of FIG. 3.

FIG. 4 is a flow chart showing the procedure of producing color separation negatives (or positives) $\underline{P}$ (Y, M, C, K) by the preferred embodiment.

At a step $S_1$, an original is read by the image reading unit 11 to generate an image data I in a manner of the quick scan mode. The image data I are stored in the image memory unit 11A. Instead of the quick scan mode, the original may be read in an ordinary way, and the original image data obtained thereby may be skipped or spatially compressed; this also serves the image data I. The image data I stored in the image memory unit 11A have B, G and R components (or color separation data B, G and R).

The next step $S_2$ consists of four steps $S_{21}$, $S_{22}$, $S_{23}$ and $S_{24}$. At the step $S_{21}$, some (seemingly relevant) reproduction conditions are inputted into the condition setting unit 12. At the step $S_{22}$, the image data I are supplied from the image memory unit 11A to the image processing unit 13. The image data I are modified under the reproduction conditions stored in the image processing unit 13. At the step $S_{23}$, the object image is shown on the CRT display 30, along with one of the reference images selected by an operator. The operator compares the object image with the reference image while adjusting the reproduction conditions by means of the console panel 21 at the step $S_{24}$; the reproduction conditions are adjusted such that the color tone of the object image conforms to that of the reference image as much as possible. The adjustment of the reproduction conditions and the display of the images, that is, the steps $S_{22}$ through $S_{24}$ are repeatedly performed, if necessary.

Several methods showing the object image and the reference image can be applied. First, the object image and the reference image may be simultaneously shown on respective CRT displays in a manner of full-sized display. The full-sized display denotes the method in which the images are displayed without skipping nor spatial compression. Second, the faceplate of one CRT display may be divided into two parts, a right hand part and a left hand part for example, for the object image and the reference image, respectively. In this case, the whole parts of the two images or the halves of the two images may be displayed on the CRT display. Third, the object image and the reference image may be alternately shown on one CRT display.

In either of those methods, only parts of respective images for the use of comparison may be displayed.

At a step S₃, the color scanner operates under the reproduction conditions established at the step S₂, whereby the image recording unit 19 exposes photosensitive material to produce a reproduced object image. The photosensitive material is developed to form the 5 color separation negatives (or positives) P (Y, M, C, K). Instead of recording the color separation images on the photosensitive material, the modified image data J (Y, M, C, K) modified under the reproduction conditions may be stored in a memory unit, such as a magnetic disc, provided in a color page make-up system or the like.

In this embodiment, the image memory unit 11A is provided in the image simulator 20 as a means for supplying the image data I to the image processing unit 13. However, another means may be employed for the purpose. For example, the image memory unit 11A may be omitted and the image input unit 11 may be activated every time the image data I is required. In any case, however the storage unit 31 for reference images is required to be provided in the image simulator 20.

The image simulator 20 may be included in the scanner 10. If the scanner 10 comprises a host computer, it may play the role of the host computer 22 shown in FIG. 3.

Figure 5:
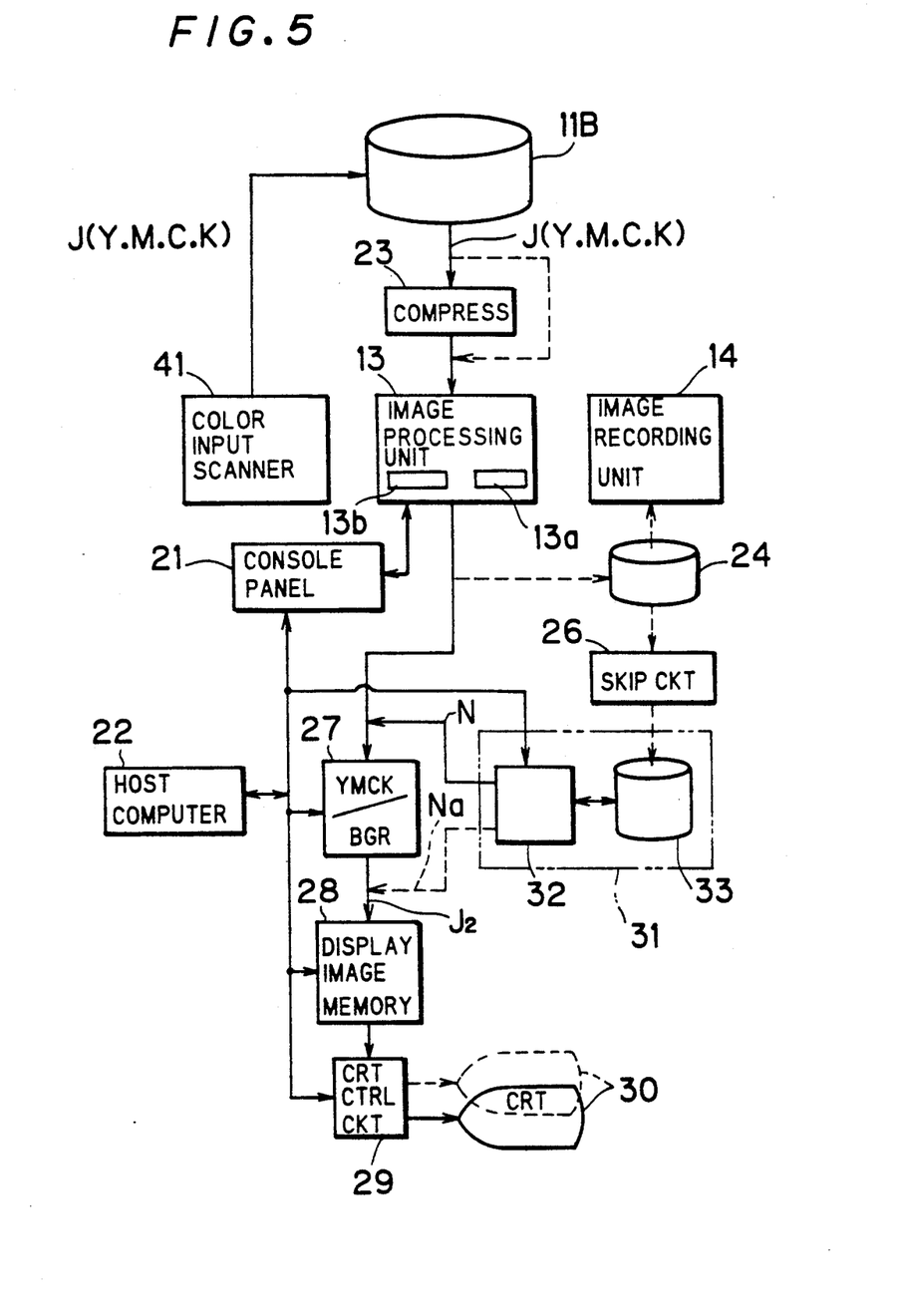
FIG. 5 is a block diagram showing the structure of an apparatus according to another preferred embodiment of the present invention.

FIG. 5 is a block diagram showing the structure of a retouch station (or color tone modifying part) in a color page make-up system system according to another preferred embodiment of the present invention. The color page make up system can simultaneously process several original images in order to form an edited image with respect to each page of printed sheet. The retouch station has a structure which is similar to that shown in FIG. 3, and which comprises a color input scanner 41 instead of the image reading unit 11, the condition setting unit 12 and the image processing unit 13 in FIG. 3, a image memory unit 11B of comparatively large capacity instead of the image memory unit 11A, a spatial compression circuit 23, a memory unit 24 and a skipping circuit 26. The rest of the components are the same as those shown in FIG. 3: Such as the image processing unit 13, the image recording unit 14, the console panel 21, the host computer 22, the YMCK/BGR matrix circuit 27, the display image memory 28, the CRT control circuit 29, the CRT display 30, and the storage unit 31 comprising the storage control circuit 32 and the storage part 33. The color input scanner 41 has a function of the image reading unit 11, the condition setting unit 12 and the image processing unit 13.

Figure 6:
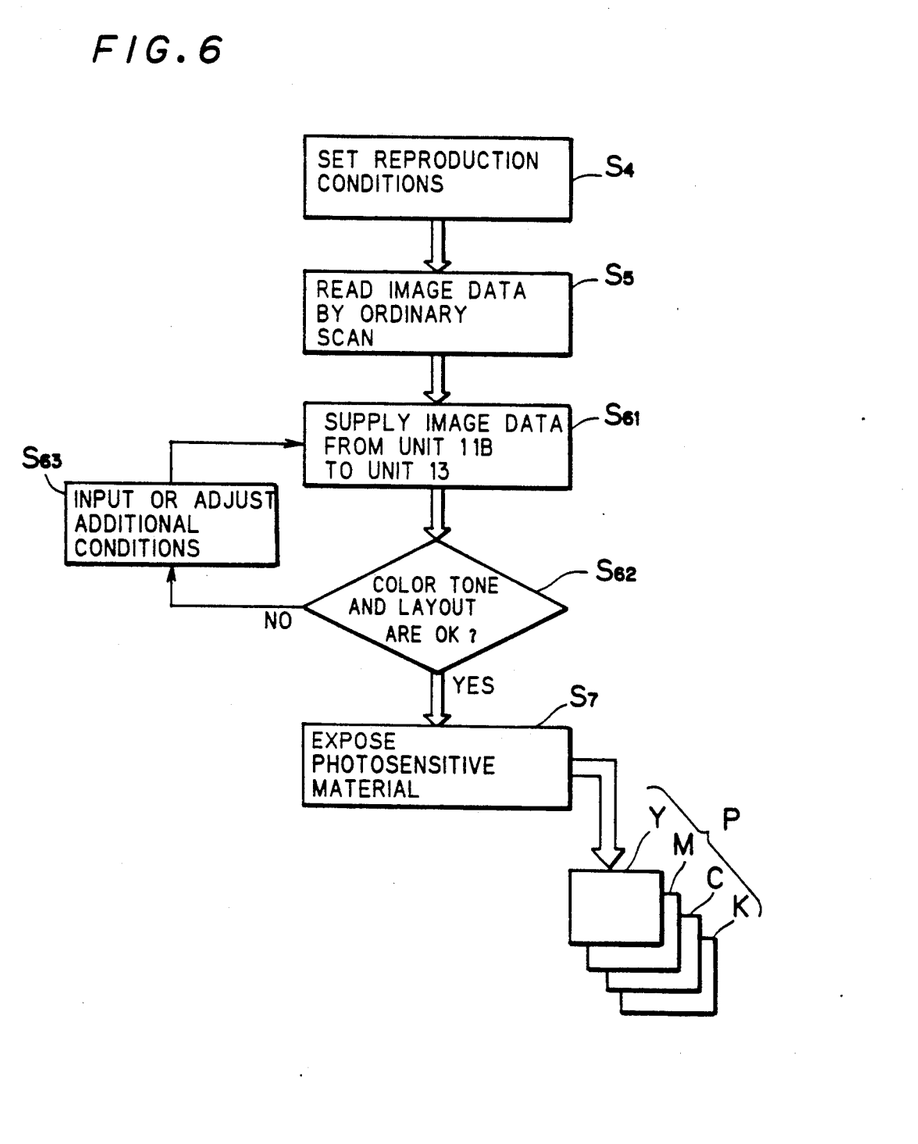
FIG. 6 is a flow chart showing the operation of the preferred embodiment of FIG. 5.

FIG. 6 is a flow chart showing the procedure of producing color separation negatives (or positives) P (Y, M, C, K) by the embodiment of FIG. 5.

At a step S₄, some (seemingly relevant) reproduction conditions are set in the color input scanner 41.

Then, at a step S₅, the color input scanner 41 reads a plurality of originals to generate modified image data J by ordinary scanning. The modified image data J are stored in the image memory unit 11B. Instead of the modified image data J, the image data I before the data processing, as shown in FIG. 3, may be stored in the image memory unit 11B. The image data I may consist of B, G and R components or other types of components.

Within a plurality sets of the modified image data J corresponding to the plurality of the originals, one set of the modified image data J is arbitrarily selected and employed to make a proof image on the CRT display 30 in the proof mode at a step S₆₁ (corresponding to the step S₂₂ of FIG. 4). In this operation, the modified image data J are supplied from the image memory unit 11B to the spatial compression circuit 23, and compressed thereby (or skipped by a skipping circuit). The compressed image data are supplied to the image processing unit 13 and stored in a first memory 13a thereof. The compressed image data are further supplied from the image processing unit 13 to the YMCK/BGR matrix circuit 27 in order to make a proof image (an object image) on the CRT display 20.

At this step S₆₁, one of the reference images stored in the storage unit 31 is selected by an operator and shown on the CRT display with the object image.

At a step S₆₂, the operator compares the color tone of the object image with that of the selected reference image. Further, the operator edits the object image, that is, decides the layout of the object image in a page of printed sheet.

At a step S₆₃, the operator inputs additional conditions concerning the reproduction conditions and the editing (or layout) by means of the console panel 21. The additional conditions are stored in a second memory 13b provided in the image processing unit 13. Then, the step S₆₁ is executed again such that the compressed image data stored in the first memory 13a are modified under the additional conditions and supplied to the YMCK/BGR matrix circuit 27 in order to make a proof image again. The steps S₆₁ through S₆₃ are repeatedly executed, whereby the additional conditions themselves are adjusted until they give a proof image of proper color tone.

The additional conditions are kept in the second memory 13b until several sets of the modified image data J, which are enough to form one page of the printed sheet, are processed by the above stated procedure. Therefore, the additional conditions are stored with respect to each of the several sets of the modified image data J, that is, with respect to each original.

At a step S₇, the several sets of the modified image data J with original resolution, that is, without compression, are sequentially supplied from the image memory unit 11B to the image processing unit 13 while bypassing the spatial compression circuit 23.

The image processing unit 13 modifies the modified image data J under the additional conditions stored in the second memory 13b and supplies the image data after the additional modification (concerning the color tone and the editing) to the memory unit 24. The image data stored in the memory unit 24 will be referred to as "processed image data". The processed image data are read out and supplied to the image recording unit 14, whereby color separation images after the additional modifications concerning the color tone and the editing are recorded on photosensitive material.

Incidentally, the processing of the modified image data J with the original resolution may be performed every time when the additional conditions are fixed for each original. Further, such simulation may be performed by means of another image processing unit (not shown) which is separately installed, and which has the same function as the image processing unit 13.

In this apparatus, the processed image data stored in the memory unit 24 can be supplied to the storage part 33 of the storage unit 31 through the skipping circuit 26 (or a spatial compression circuit). Therefore, by means of selecting the processed image data which produce excellent printed sheet, the selected image data can be stored in the storage unit 31 as the reference image data.

Incidentally, the color scanner 10 of FIG. 3 may be connected to a color page make-up system comprising a memory unit like the memory unit 24 of FIG. 5, which stores the processed image data. In this case, the processed image data can be supplied to the storage part 33 of FIG. 3 through a skipping circuit as the reference image data.

Although the present invention is applied to a color scanner or a color page make-up system of four color type in the above embodiments, the present invention can be generally applied to image scanners including that of black and white type.

In place of a high-priced display means for displaying the proof image simulating the object image with comparatively high precision for the color tone of multicolor image, a cheaper display means with comparatively low precision can be applied in the above embodiments. Even by the cheaper display means, the color tone of the proof image can be matched with that of the reference image.

According to the present invention, an operator can establish the reproduction conditions for an object image while comparing the object image with a reference image corresponding to a reproduced image of proper color tone, wherein the object image and the reference image are both shown on a display means. Accordingly, even a non skilled operator can establish appropriate reproduction conditions in spite of the difference in a range of color reproducibility between the display means nd color inks. Further, the operator can adjust the reproduction conditions properly because small differences in the color tone between the object image and the reference image can be precisely recognized on the display means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for simulating an object image to be printed which is obtainable by modifying a given original image data into a modified image data and then printing said object image using a process scanner on the basis of said modified image data, said apparatus comprising:
    (a) means for inputting said original image data,
    (b) means for variably designating modification conditions employable in modification of said original image data,
    (c) means coupled to said means (a) and (b) for modifying employable in modification of said original image data,
    (c) means coupled to said means (a) and (b) for modifying said original image data into said modified image data in accord with said modification conditions,
    (d) means for storing reference image data set by earlier printing a reference image and then confirming that the printed reference image has desired image characteristics,
    (e) display means for displaying one or more images on the basis of given image data, and
    (f) means coupled to said means (c), (d) and (e) for transmitting said modified image data and said reference image data to said display means as said given image data in order to display on said display means first and second images on the basis of said modified image data and said reference image data, respectively, so that said first and second images can be visually compared with each other.

2. An apparatus in accordance with claim 1, wherein said means (f) includes means for transmitting said modified image data and said reference image data to said display means in parallel, whereby said first and second images are displayed on said display means simultaneously.

3. An apparatus in accordance with claim 1, wherein said means (f) includes means for transmitting said modified image data and said reference image data to said display means alternately, whereby said first and second images are displayed on said display means alternately in time.

4. An apparatus for simulating an object image to be printed on a process scanner, the apparatus comprising:
    (a) means for supplying original image data by which said object image is reproduced,
    (b) means for setting reproduction conditions concerning color and gradation for said original image data,
    (c) means for processing said original image data under said reproduction conditions, thereby generating modified image data,
    (d) means for storing reference image data by which a reference image is reproduced,
    (e) display means for displaying a proof image simulating said object image as a function of said modified image data and for displaying said reference image data, and
    (f) means for adjusting said reproduction conditions, wherein adjusting data are manually input such that color and gradation of said reference image conform to those of an adjusted proof image which is displayed on said display means as a function of said original image data under said reproduction conditions adjusted by said adjusting data.

5. An apparatus in accordance with claim 4, wherein said means for supplying original image data comprises means for spatially compressing or skipping said original image data, to thereby generate a compressed image data, and
    said display means displays said proof image as a function of said compressed image data.

6. A method of simulating an object image to be printed on a process scanner, the method comprising the steps of:
    (1) preparing reference image data by which a reference image is reproduced;
    (2) preparing original image data by which said object image is reproduced;
    (3) preparing reproduction conditions concerning color and gradation for said original image data,
    (4) processing said original image data in accordance with said reproduction conditions, to thereby generate modified image data,
    (5) displaying a proof image simulating said object image on a display means as a function of said modified image data and displaying said reference image data,
    (6) adjusting said reproduction conditions, and processing said original image data under adjusted reproduction conditions, to thereby generate said modified image data, and (7) executing repeatedly said steps (5) and (6) such that color and gradation of said proof image conform to those of said reference image.

7. A method in accordance with claim 6, wherein said step (2) comprises a step of spatially compressing or skipping said original image data, to thereby generate a compressed image data, and steps (3) through (7) are executed on the basis of said compressed image data in place of said original image data.

8. A method in accordance with claim 7, wherein said reference image data are prepared for at least one reference image with respect to each of plural types of images.

9. A method in accordance with claim 8, wherein said reproduction conditions include conditions about layout of a said object image in a page of printed sheet.

10. A method in accordance with claim 6, wherein said step (2) is performed such that an original of said object image is so read as to generate said original image data skipped in comparison with an image data obtained by ordinary reading.

11. A method in accordance with claim 10, wherein said reference image data are prepared for at least one reference image with respect to each of plural types of images.

12. A method in accordance with claim 11, wherein said reproduction conditions include conditions about layout of a said object image in a page of printed sheet.

* * * * *